Dec. 24, 1968     D. R. EMMEL ET AL     3,418,408

METHOD FOR MAKING WARE PRODUCING MOLD MEMBERS

Filed May 3, 1966

INVENTORS
DONALD R. EMMEL
ANDREW R. BLACKBURN
VIRGIL D. KENDALL

BY

*Irons, Birch, Swindler & McKie*

ATTORNEYS

United States Patent Office 3,418,408
Patented Dec. 24, 1968

3,418,408
METHOD FOR MAKING WARE PRODUCING
MOLD MEMBERS
Donald R. Emmel, Springfield, Andrew R. Blackburn,
Westerville, and Virgil D. Kendall, Springfield, Ohio,
assignors to Ram Incorporated, Springfield, Ohio, a
corporation of Michigan
Filed May 3, 1966, Ser. No. 547,347
11 Claims. (Cl. 264—221)

ABSTRACT OF THE DISCLOSURE

A method for making a ware producing mold member incorporating a network of passages for fluid release of the molded article comprising shaping a mass of molding material to obtain a portion having a face contoured in accordance with a portion of the ware to be produced, embedding a pattern of burn out material within said mass, approximating the structure of said contoured face of said mass, and uniformly spaced from said face portion and firing said mass into a porous mold member containing a network of passages within said mold member, formed as a result of the elimination of the burn out material during said firing.

---

This invention is concerned with the art of pressed ware production especially relating to fluid pressure release molds made from porous materials and used in shaping ware from plastic material such as clay. More particularly the invention is directed to fluid pressure release molds having a network of passages therein for receiving pressure release fluids and most effectively distribute such fluids through the pores in the mold to the face of the mold incident release of the pressed ware from the mold face and in purging moisture from the mold pores.

Fluid pressure release molds have been developed to speed up the production of molded objects. At one time, molded objects such as potteryware were separated from the face of the mold by the shrinkage of the object as it dried. This process necessitated the use of a large number of molds since each mold had to be left in association with the object for a length of time to permit separation of the object from the mold surface by shrinkage resulting from drying.

This problem, ultimately led to the development of fluid pressure release molds which released the object from the face of the mold by directing fluid pressure against the object through the mold face. Blackburn et al. Patent 2,584,-109 issued Feb. 5, 1952, describes the "fluid release process" as it is known in the art and known commercially as the Ram Process. The molds used in this process characteristically have had conduits such as perforated pipes, embedded in the material of the mold disposed a short distance below the mold face. This use of embedded conduits was a simple expedient since the mold commonly was made of a porous material, such as plastor of Paris, which could be cast at room temperatures, and the pressure release fluid could pass through the porous plaster material of the mold to the mold face. These fluids applied sufficient pressure to the clay object, distributed over the surface of the mold, to separate the object from the face of the mold. The production of ware through the use of the pressure release molds has had a considerable degree of success and today it is extensively used.

The success of fluid pressure release molds depends largely upon the ability of the molds to provide a uniform blanket of pressure to the surface of the molded object. If the pressure is confined to a few points or areas, the pressed object will be deformed or broken incident it removal from the mold face. Thus, it is necessary that the openings in the conduits be spaced so as to insure that as the fluid pressure passes out of the openings and through the pores of the mold it will spread out and uniformly exit over the entire ware pressing face of the mold.

To get more uniform distribution of the pressure release fluid, attempts have been made to form the conduit in the body of the mold rather than using pipe or the like. This has been done by casting wax or other material having a low melting point into the desired shape of the conduit and embedding the cast wax in the wet plaster of Paris as the mold is being formed. After the mold is formed, it is heated to melt the wax which is then poured out of the conduit. This approach dictated that the melting point of the wax be low so that the plaster of Paris mold would not be damaged in the heating step. This method has not been successful because the wax or other low melting point materials that were used tend to clog the pores of the plaster of Paris mold thus destroying the surface porosity requisite for the mold to function in the "fluid release process."

Recently, porous ceramic molds have been developed which can be used in place of plaster of Paris molds and offer substantial increase in the ware pressing mold life over plaster molds. As a part of the forming process, these ceramic molds are fired at extremely high temperatures in the order of about 1500° F. and higher. The temperatures of these firing steps is often near or above the meltting point of many metals and thus created difficulties in the use of metal pipes as conduits in fluid pressure release molds.

It is therefore a principal object of the present invention to provide an improved method of forming a fluid pressure release mold having a network of passages therein for receiving pressure release fluid to be distributed through the pores of the mold to the mold face.

Another object of this invention is to provide a method for forming a fluid pressure release mold having a network of passages which permits the pressure release fluid to pass into the pores of the mold along substantially the entire length of the passage.

A further object of this invention is to provide an improved method for making fluid pressure release molds in which the material used to form the passages in the mold may be removed without clogging the pores of the mold.

Still another object of this invention is to provide a method for forming fluid pressure release molds having passages therein for distribution of pressure release fluid, which passages will not be damaged by the firing of the mold at high temperatures.

Additional objects and advantages of the invention will become more apparent from the following description of specific embodiments of the invention described in conjunction with the drawing forming a part of this application.

The invention which accomplishes the above objects and purposes may be described as a method for forming porous mold members having a network of passages therein for receiving pressure release fluid to be distributed through the pores of the mold member to the mold member face, generally comprising placing a pattern of burn out material having a configuration representative of the desired network of passages to be provided in the mold member into a master mold together with a material for forming porous molds, causing the mold forming material to set, and burning out the pattern while firing the mold member whereby the desired network of passages is produced in the finished mold member.

As used herein the term "burned out material" refers to the various materials examples of which are mentioned hereinafter and which will be burned out of a mold member at the temperatures used in firing ceramic molds without the material or resulting ash sealing the pores in the mold member. The term "set" as used herein refers to the condition of a mold member when it is self supporting such as to be capable of holding its own shape. The term "mold member" is used to generically encompass a section of a mold used in casting ware pieces and a section of a die used on a press in a ware pressing operation.

The pattern which is embedded in the mold member when initially shaped may be formed of any suitable burn out material. However, it is obviously desirable that the pattern be inexpensive, and yet it is necessary that it have sufficient strength to prevent the mold forming material from crushing or distorting the pattern when the pattern is being embedded therein.

A preferred method of making the pattern is by forming a self-sustaining or fairly rigid burn out material into a frame conforming to the shape of a first portion of the desired network of passages in the mold member and securing lengths of other burn out material to this frame, these lengths of other burn out material conforming to the shape of a second portion of the desired network of passages. The self-sustaining or rigid burn out material may be wire such as copper, thin wood strips like balsa wood, etc. The lengths of other burn out material may be a limber inexpensive material such as yarn which preferably is stiffened to prevent the limber material from being distorted when contacted with the mold forming material. This stiffening may be accomplished by starching the material where yarn is employed in which case it is desirable thereafter to treat the starched material with a sealing agent such as shellac to prevent the starch from being dissolved by the moist mold forming material when the mold is being shaped. The entire pattern could, of course, be made of the self-sustaining or rigid burn out material, however, it is usually desirable to use only a minimum amount of self-sustaining material and to complete the pattern with less expensive limber material. Additionally, a burn out material grid layer of nylon, paper or other fiber made up in the form of a netting or open weave cloth can advantageously be secured over the materials making up the first and second portions of the desired network of passages in the mold member. This grid layer will, upon burn out, provide a myriad of fine passages intercommunicating with the network of larger passages resulting from burn out of the self-supporting and other burn out materials.

While this invention can be used to make various types of molds, it has particular utility in the making of porous ceramic ware pressing die members. The following detailed descriptions of the preferred specific embodiments of the invention will be directed to the use of the invention in making porous ceramic ware pressing die members.

Referring to the drawings.

Figure 1:
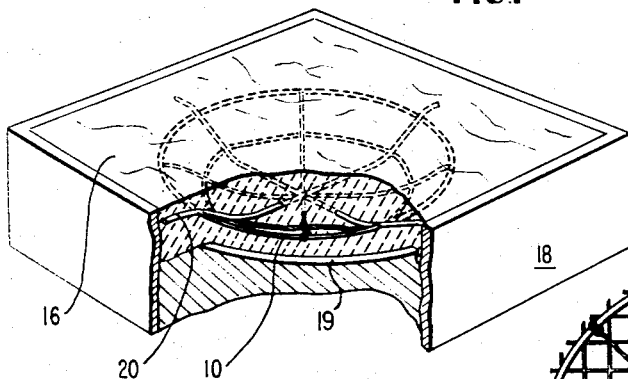
FIGURE 1 is a perspective view, partially in section, of a master mold for making die members showing one form of burn out pattern embedded in die forming material in the master mold.

The die member may be formed by any of the several well-known prior art processes as, for example, by slip casting, pressure casting, injection molding or pressing. FIGURE 1 illustrates a die member being made using a slip casting process. These processes for handling plastic clay-like materials in manufacturing various vitreous china and pottery ware products are well known, and a description of each in detail need not be included herein. Specific examples will be given hereinafter concerning how one or another of the processes is employed in connection with the instant invention.

Figure 2:
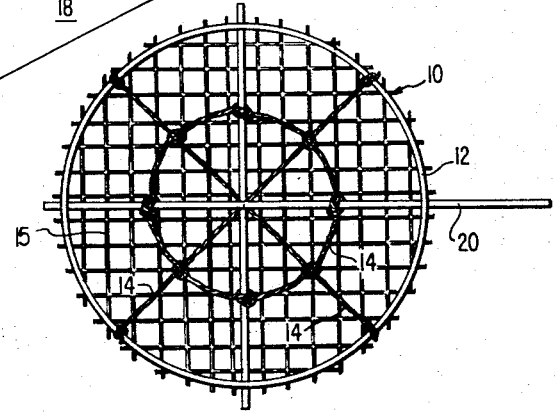
FIGURE 2 is a plan view of a typical form of burn out pattern to be embedded in the die forming material but differing from the pattern shown in FIGURE 1.

FIGURE 2 illustrates a typical embodiment of a pattern 10 to be embedded in a die forming material and produce a network of passages in the resulting die member when burned out. The pattern is comprised of a wire frame 12, which provides initial rigidity to the pattern. The wire offers a self-supporting rigid burn out material capable of supporting the other burn out materials while the die member is being shaped. The frame is shaped to follow the contours which the face of the die member is to have eventually. It conforms to the shape and distribution of a first portion of the desired network of passages to be formed in the die member. The frame is so constructed that one or more of its ends 20 will extend to the edge of the die member to provide a means for connecting the network of passages to a source of fluid pressure. Also the outer extensions of the frame can function in suspending the burn out pattern within a master mold while the die member is being shaped.

Lengths of limber burn out material such as yarn 14 are tied, glued or otherwise secured to frame 12. These lengths of yarn conform to the configuration of a second portion of the desired network of passages to be formed in the die member.

The yarn is preferably treated with a stiffening agent such as starch to stiffen the yarn so that it will not be crushed or displaced from its desired position when it is embedded in the die forming material in the master mold. Where a stiffening agent such as starch is used, the starched material should be treated with a sealing agent such as shellac to prevent the moisture in the die forming material from softening or dissolving out the starch. Of course, various other stiffening agents may be used where the limber burn out material is yarn.

The pattern 10 as shown in FIGURE 2 is completed by a grid 15. This grid consists of burn out material in the form of a layer of netting or open weave cloth, the threads of which may be suitably formed of nylon, paper or other composition. Grid 15 is appropriately secured over the wire frame 12 and lengths of yarn 14. The grid may be secured by adhesive or a thread or fine wire looped through the interstices of the grid and around the wire of frame 12.

Burn out of the netting or open weave cloth forming the grid layer provides a myriad of fine passages interconnecting with the larger passages formed incident burn out of the wire frame 12 and lengths of yarn 14. It will thus be appreciated that in the completed die member the main air passages for the pressurized fluid used in releasing ware from the die member will be formed by the interconnecting larger passages resulting from burning out the wire and yarn. The finer passages resulting from burning out the grid material will provide a more uniform overall distribution of the pressurized release fluid for such fluid to pass through the pores of the die forming material and apply a blanket of release fluid in separating the ware from the die member.

In some instances, depending largely on the size and shape of the piece of ware to be produced, the burn out pattern may omit the layer of netting or open weave cloth forming grid 15. In such instances a sufficiently complete network of passages can be produced to get good fluid pressure ware release by utilizing a pattern made up only of a frame 12 and lengths of limber burn out material 14. Thus the combination of burn out wire and stiffened yarn can suffice. Such a simplified burn out pattern 10, without a grid 15 is shown embedded in die forming material on FIGURE 1 as now will be described.

On FIGURE 1, it may be seen that to make a ceramic die member following the teachings of this invention, burn out pattern 10 (exemplified without a grid 15) is embedded in a die forming material 16 which material when fired will present the requisite porosity for the die member to be used in the "pressure release process." One suitable approach is shown in FIGURE 1 wherein a master mold 18 has its bottom surface 19 shaped to the contour desired for the article that is going to be pressed using the die member. As previously mentioned, the pattern 10 is generally shaped correspondingly so that the passages left after burn out of the pattern will be uniformly distributed, spaced from the final shaped face of the die member.

The bottom of the master mold 18 which provides the shaped surface 19 effective in giving the desired contour to the die member cast in the master mold may appropriately be formed of a porous material such as plaster of Paris. Accordingly, when slip casting the die member from the die forming material 16, such material will be poured into the upper cavity of the master mold 18 and the porous plaster bottom of such mold will absorb moisture from the die forming material such that the material will set into a self-supporting state whereupon the semi-finshed die member can be removed from the master mold 18 for firing.

Before the die forming material 16 is poured into master mold 18 the pattern 10 is mounted in the master mold appropriately spaced above the surface 19 for the purpose mentioned above. This mounting in the master mold may conveniently be accomplished by one or more of the protruding ends 20 of the frame 12 being fastened to the edge of the master mold in any suitable manner. The laterally projecting end may extend into an opening in the edge of the master mold. In such event where the die member is fired so that the pattern 10 is burned out, the opening in the side wall of the die member left by the projecting end 20 may conveniently be used to connect the release fluid supply line that is needed when the die member is mounted on a press.

The die forming material 16, which in the approach suggested in FIGURE 1 is formed by slip casting into the desired die member configuration, is to be a material which when fired will produce the requisite porosity within the material. Thus the release fluid introduced into the network of the passages left by burn out of pattern 10 must be capable of moving from this network of passages into the pores of the die member and produce the blanket of release fluid necessary to separate the pressed ware from the die member when such member is in use.

With the types of burn out material making up pattern 10 shown and described hereinabove, a suitable ceramic material for producing a porous die member is disclosed in co-pending Blackburn et al. application Ser. No. 309,870 entitled "Crystalline Bonded Ceramic Ware Pressing Mold and Method of Making Same," filed Sept. 18, 1963. The particular material as described in such application has the characteristic of not undergoing shrinking during drying. Further, such shrinking that may occur starts at about 1600° F., at which temperature burn out of pattern 10 will already have taken place. Thus the use of wire frame 12 as part of pattern 10 and the rigidity offered by such frame does not interfere with the shrinkage encountered at the elevated firing temperatures. Cracks in the finished die member might result if the die forming material had the characteristic of shrinking either during drying or in the early stages of firing at a point where the self-supporting or rigid wire frame 12 had not burned out but remained intact to resist the shrinking action.

After the die forming material has set in the master mold 18 the semi-finished die member with the pattern embedded therein is removed from the master mold, appropriately air dried and then fired at temperatures above about 1500° F. The ceramic material disclosed in the above-mentioned Blackburn et al. application is to be subjected to firing temperatures above 2000° F. resulting in the pattern 10 being burned out leaving a network of passages in its place and the resultant porosity of the ceramic material being available to receive and conduct fluid from such passages to the die member face for release of the ware being pressed. Ash remaining from the burn out of the material of pattern 10 does not interfere with the ultimate function of the die member and need not be removed when materials for making up the pattern are selected, as mentioned hereinabove. Since the various components making up pattern 10 are all interconnected, the passages in the die member resulting from burn out of the pattern are also interconnected, and fluid pressure entering through one passage will be distributed to the whole network.

With a self-supporting pattern 10 such as described hereinabove, a number of different techniques may be employed in embedding the pattern in the die forming material. A closed cavity mold may be employed with the pattern 10 suitably suspended within the cavity and the die forming material introduced into the cavity under pressure in the form of a slip. Alternatively, an initial layer of die forming material may be produced in a mold with one face having the desired contour for the finished die member and the opposite face having an appropriate contour over which the pattern 10 may be placed. If desired, the pattern may be formed as a separate unit and placed over this initial layer of die forming material or the components for the pattern may be individually placed in succession on the layer of material thus building up the pattern in situ on the initial layer of die forming material. After the pattern has been so placed, a second or final layer of material may be applied over the pattern such that the pattern will be sandwiched or embedded between two layers and thus the die member shaped in semi-finished form ready for firing.

In any event, irrespective of the approach taken to embed the pattern in the die forming material, after such has been accomplished the semi-finished die member will be fired as mentioned above to burn out the pattern and produce the requisite network of passages in the die member and also contribute porosity to the die forming material as a result of the firing action.

The completed die member need not be comprised solely of porous die forming material. The pattern may be embedded in the die forming material, the firing carried out to burn out the pattern and produce the porosity in the die forming material and thereafter this fired die member may be backed up for its service on a ware press by a backing material such as plaster, low melting alloy or casting epoxy resin with filler. This composite may then appropriately be enclosed in a steel die case or ring to further strengthen it for use on a ware press.

Figure 3:
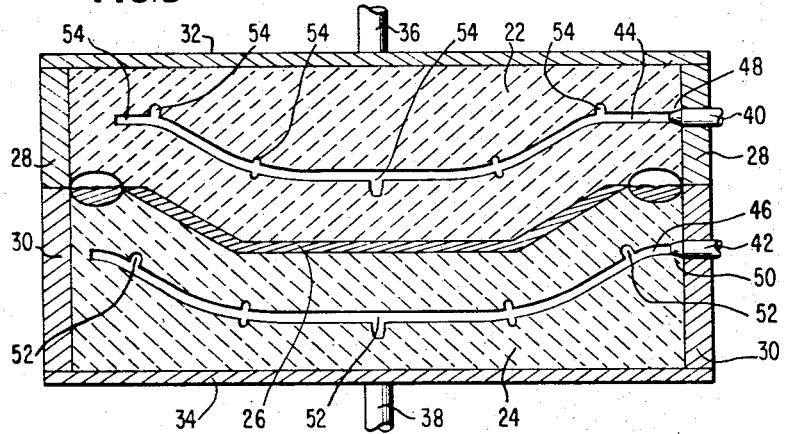
FIGURE 3 is a vertical sectional view of two die members, made in accordance with the teachings of this invention, mounted in a press and showing a portion of the network of passages formed in the die members by the burning out of the pattern.

FIGURE 3 on the drawing illustrates a pair of cooperable ceramic die members 22 and 24 produced in accordance with the instant invention. The cavity between the two die members in which the ware is to be pressed is shown for purposes of illustration contoured to press a shallow dish or plate 26. The die members 22 and 24 are enclosed in metallic rings 28 and 30, respectively. The die member 22 is then mounted on press platen 32 and die member 24 mounted on press platen 34. These press platens are appropriately actuated by the hydraulically operated ware press as diagrammatically represented by reciprocating shafts 36 and 38 which operate to open and close the mold cavity formed between the two die members 22 and 24.

To release the pressed ware from the surfaces of die members 22 and 24, fluid pressure delivery pipe 40 connected through suitable valving (not shown) to a source of fluid pressure extends through die ring 28. Similarly, a fluid pressure delivery pipe 42 extends through die ring 30 to supply release pressure to die member 24. These fluid pressure delivery pipes communicate with passages 44 and 46, respectively, within the die members, the delivery pipes having suitably tapered ends 48 and 50 to lead the pipes into fluid-tight communication with the passages in the die members 22 and 24.

It will be recognized on FIGURE 3 that passage 46 in lower die member 24 communicates with the network of passages 52 in such die member. Similarly, passage 44 communicates with the network of passages 54 in the upper die member 22. Of course, these networks of passages in the respective die members were produced incident burn out of the patterns 10 in the manner heretofore described for making a die member.

Mention was initially made herein of the "fluid release process" in which die members formed in accordance with the invention are to be used. Briefly stated, when the clay piece has been pressed such as the dish or plate 26 shown in FIGURE 3, release fluid is introduced to the network of passages 52 in the lower die member 24. This fluid passes upwardly through the pores of the die member 24 and frees the pressed ware plate 26 from the lower die member. The die members are separated by operation of the ware press applied through shafts 36 and 38, the ware adhering to the upper die member 22 as such die member rises. Thereafter, pressure release fluid is introduced to the network of passages 54, such fluid passing downwardly through the pores of die member 22 and freeing the pressed ware from the upper die member such that it may manually or automatically be removed from between the reciprocating ware press platens.

Certain die forming materials which are capable of being fired to give an appropriately porous and yet extremely durable die member for use in the "fluid release process" commercially known as the Ram Process, characteristically shrink while undergoing drying or while being fired. A die forming material possessing this characteristic is disclosed and claimed in co-pending Blackburn et al. application Ser. No. 309,894 entitled "Glass Bonded Ceramic Ware Pressing Mold and Method for Making Same," filed Sept. 18, 1963, abandoned in favor of continuation application Ser. No. 573,727, filed Aug. 19, 1966. Where such a die forming material is employed, the use of a burn out pattern 10 as disclosed hereinabove having a wire frame 12 or any other rigid members is not suited in making the die member. Where the die forming material undergoes shrinkage while the wire frame or other rigid members are intact, i.e., before burn out, embedded in the die member, strains and resultant cracks in the die member are likely.

Where the type of die forming material of this latter Blackburn et al. application is used, the pattern 10 ideally may be formed of lengths of limber material such as yarn which desirably is stiffened by starching. In addition, the lengths of limber burn out material will be glued or secured to a burn out grid layer made up of netting or open weave cloth such as mentioned hereinabove. With this combination of pattern material embedded in the die forming material, the moisture to which the burn out pattern is exposed during air drying will sufficiently soften the burn out material such that strains resulting in cracks during drying and subsequent firing will not result.

Where a pattern 10 absent the self-supporting burn out material as provided by the wire frame 12 is employed, embedding this pattern in the die member may best be accomplished by a double forming technique. This technique involves initially molding or casting one layer of the die forming material and then placing the lengths of starched yarn and grid layer over this initially formed layer. Then a second layer is molded or cast over the first layer leaving the yarn and grid layer pattern sandwiched between the two layers of die forming material.

The double forming technique may conveniently be carried out in one of two ways. A solid first layer may be molded between two plaster molds followed by removing the upper mold section, roughing up the surface of the layer, placing the pattern over this solid first layer and then with a larger upper mold in place of the first one, molding an additional thickness over the first solid layer. Thereafter the semi-finished die member is removed from between these two mold sections. Alternatively, employing a drain slip casting method, the die forming material in the form of a slip may be introduced into the cavity between the two mold sections. When the desired thickness layers have built up on the upper and lower mold faces of the cavity, the remaining liquid slip is drained from the mold cavity, the two mold sections are then separated and the appropriate burn out pattern inserted in the space left by draining the slip from the cavity. The mold sections can then be rejoined and die forming material in the form of a slip again introduced to complete the cast of material around the inserted burn out pattern.

In either of the above described double forming techniques, the pattern consisting of yarn and grid layer can be preformed as by being made up over a plaster form and then placed over the first layer or if desired, the yarn and grid layer can be cut and laid individually in succession over the first layer. Where the pattern is formed in situ, and the first of the above mentioned double forming techniques is employed, it may be desirable to wet the surface of the first formed layer such that the components of the pattern will appropriately adhere to such layer.

There has been described and illustrated what are considered to be the preferred specific embodiments of the invention. It will be understood, however, that various modifications and variations of this invention will become readily apparent to those skilled in the art within the scope of the invention as defined by the appended claims.

What is claimed is:

1. A method for making a ware producing mold member having a network of passages therein for distribution of release fluid to the pores of the mold member to release ware from the mold member face comprising:
   shaping a mass of mold forming material to have a face contoured in accordance with a portion of the ware to be produced,
   embedding a pattern of burn out material within said mass, said pattern having a configuration approximating that of said contoured face of said mass and being generally uniformly spaced from said face within said mass, and
   firing said mass of mold forming material into a porous mold member with consequent burn out of said pattern and formation of said network of passages within said mold member.

2. A method for making a ware producing mold member having a network of passages therein for distribution of release fluid to the pores of the mold member to release ware from the mold member face comprising:
   placing a pattern of burn our material embedded in a mold forming material in a master mold, to shape a semi-finished mold member, said pattern having a configuration representative of the network of passages desired to be provided in the mold member,
   removing said semi-finished mold member from said master mold, and
   firing said semi-finished mold member to burn out said pattern leaving the desired network of passages and produce a finished porous mold member.

3. The method as recited in claim 2 wherein said finished mold member is enclosed in a metal die case suitable for mounting on a ware press to be used in a ware pressing operation.

4. The method as recited in claim 2 wherein said pattern is made by forming a self-sustaining burn out material into a frame conforming to the configuration of a first portion of the desired network of passages for the mold member, and securing a length of limber burn out material to said frame, said length of limber burn out material conforming to the configuration of a second portion of the desired network of passages.

5. The method as recited in claim 4 wherein said self-sustaining burn out material is a metallic wire and said length of limber burn out material is yarn.

6. The method as recited in claim 4 wherein said length of limber burn out material is stiffened when secured to said frame to prevent said limber material from being crushed or distorted when contacted by said mold forming material.

7. The method as recited in claim 2 wherein said pattern is made by forming a self-sustaining burn out material into a frame conforming to the configuration of a first portion of the desired network of passages for the mold member, securing a length of limber burn out material to said frame, said length of limber material conforming to the configuration of a second portion of the desired network of passages, and applying a grid layer of open weave burn out material over said frame and length of limber material.

8. The method as recited in claim 2 wherein said pattern is made by arranging a length of limber burn out material to conform to the configuration of one segment of the desired network of passages for said mold member, and applying a grid layer of open weave burn out material over said length of limber burn out material.

9. A method for making a ware producing mold member having a network of passages therein for distribution of release fluid to the pores of the mold member to release ware from the mold member face comprising:

forming burn out wire into a frame conforming to the configuration of a first portion of the desired network of passages for the mold member, securing yarn to said frame, said yarn conforming to the configuration of a second portion of the desired network of passages, treating said yarn with a stiffening agent to maintain the yarn against distortion when contacted with mold forming material, placing said frame with the yarn thereon together with mold forming material in a master mold, causing the mold forming material to set into a semi-finished mold member with said frame and yarn embedded therein, removing said semi-finished mold member from said master mold, and firing said semi-finished mold member to burn out said frame and said yarn leaving the desired network of passages and produce a finished porous mold member.

10. The method as recited in claim 9 wherein said stiffening agent is starch and the starched yarn is treated with a sealing agent to make said yarn resistant to moisture in the mold forming material.

11. The method as recited in claim 9 wherein a grid layer of open weave burn out material is applied over said frame and said yarn and is secured thereto to be embedded in said mold forming material.

References Cited
UNITED STATES PATENTS

| | | | |
|---|---|---|---|
| 2,632,227 | 3/1953 | Steele et al. | 264—335 |
| 3,112,184 | 11/1963 | Hollenbach. | |
| 3,156,751 | 11/1964 | Valdes et al. | 264—219 |

JULIUS FROME, *Primary Examiner.*

J. R. THURLOW, *Assistant Examiner.*

U.S. Cl. X.R.

264—334